United States Patent
Otani et al.

(10) Patent No.: US 9,244,312 B2
(45) Date of Patent: Jan. 26, 2016

(54) LIQUID CRYSTAL DISPLAY DEVICE

(71) Applicant: Japan Display Inc., Minato-ku, Tokyo (JP)

(72) Inventors: Miharu Otani, Chiba (JP); Takato Hiratsuka, Chiba (JP); Osamu Itou, Hitachi (JP)

(73) Assignee: JAPAN DISPLAY INC., Tokyo (JP)

( * ) Notice: Subject to any disclaimer, the term of this patent is extended or adjusted under 35 U.S.C. 154(b) by 85 days.

(21) Appl. No.: 13/915,660

(22) Filed: Jun. 12, 2013

(65) Prior Publication Data

US 2013/0329146 A1  Dec. 12, 2013

(30) Foreign Application Priority Data

Jun. 12, 2012 (JP) ................. 2012-132495

(51) Int. Cl.
   G02F 1/1339 (2006.01)
   G02F 1/1333 (2006.01)
   G02F 1/1337 (2006.01)
   G02F 1/1343 (2006.01)

(52) U.S. Cl.
   CPC ...... *G02F 1/13394* (2013.01); *G02F 1/133377* (2013.01); *G02F 1/1343* (2013.01); *G02F 1/133707* (2013.01); *G02F 2001/134381* (2013.01)

(58) Field of Classification Search
   CPC .............. G02F 1/13394; G02F 2001/13396; G02F 1/134363; G02F 1/133707; G02F 1/133377; G02F 2001/134381
   See application file for complete search history.

(56) References Cited

U.S. PATENT DOCUMENTS

| | | | | |
|---|---|---|---|---|
| 6,008,876 | A * | 12/1999 | Moore | 349/139 |
| 7,688,413 | B2 * | 3/2010 | Ito | 349/141 |
| 7,705,946 | B2 * | 4/2010 | Hirota | 349/141 |
| 7,728,942 | B2 * | 6/2010 | Hirakata et al. | 349/141 |
| 2005/0117108 | A1 | 6/2005 | Kume et al. | |
| 2006/0055861 | A1 * | 3/2006 | Hirota | 349/141 |
| 2007/0046879 | A1 * | 3/2007 | Hirota et al. | 349/134 |
| 2007/0216842 | A1 * | 9/2007 | Kawasaki et al. | 349/141 |
| 2008/0252841 | A1 * | 10/2008 | Funahata et al. | 349/155 |
| 2009/0153761 | A1 * | 6/2009 | Park et al. | 349/43 |
| 2009/0219478 | A1 * | 9/2009 | Park et al. | 349/155 |
| 2010/0182558 | A1 * | 7/2010 | Lu et al. | 349/141 |

(Continued)

FOREIGN PATENT DOCUMENTS

| | | |
|---|---|---|
| JP | 2005-157224 | 6/2005 |
| JP | 2009-145865 | 7/2009 |
| JP | 2010-210866 | 9/2010 |

*Primary Examiner* — Thanh-Nhan P Nguyen
*Assistant Examiner* — Jia Pan
(74) *Attorney, Agent, or Firm* — Lowe Hauptman & Ham, LLP

(57) ABSTRACT

A liquid crystal display device has a TFT substrate, a color filter (CF) substrate, a liquid crystal layer, wall structures formed on the TFT substrate, pixel electrodes provided on at least the sides of the wall structures, and common electrodes and counter electrodes formed on the TFT substrate and on the CF substrate to face each other, and a number of pixels are provided to include the TFT substrate, the CF substrate and the liquid crystal layer, wherein a light blocking region is provided around each of the number of pixels, each wall structure is arranged in the light blocking region, a support formed of a transparent and elastic material is arranged on an upper surface of each wall structure, the CF substrate is supported by the supports, and the liquid crystal layer is driven by electrical fields generated by the pixel electrodes, the common electrodes and the counter electrodes.

5 Claims, 2 Drawing Sheets

(56) References Cited

U.S. PATENT DOCUMENTS

2010/0302492 A1* 12/2010 Kubota ............. G02F 1/134363
  349/138
2011/0122332 A1* 5/2011 Kubota et al. ................... 349/44
2011/0285929 A1* 11/2011 Kubota et al. ................... 349/43

* cited by examiner

US 9,244,312 B2

LIQUID CRYSTAL DISPLAY DEVICE

CROSS-REFERENCE TO RELATED APPLICATION

The present application claims priority over Japanese Patent Application JP2012-132495 filed on Jun. 12, 2012, the contents of which are hereby incorporated into this application by reference.

BACKGROUND OF THE INVENTION (1) Field of the Invention

The present invention relates to a liquid crystal display device, and in particular, to a liquid crystal display device which is driven by a so-called in-plane switching system.

(2) Description of the Related Art

In liquid crystal display devices, the space between a TFT substrate on which pixel electrodes and thin film transistors (TFTs) are formed and the facing substrate on which color filters are formed is filled in with liquid crystal so that the molecules of this liquid crystal are driven and controlled through an electrical field so as to form an image. From among them, liquid crystal display devices driven by a system that is referred to as an in-plane switching system (IPS system) have been widely used in recent years.

The IPS system is a system for driving liquid crystal where liquid crystal molecules are aligned horizontally to the surface of the panel and are rotated within a plane parallel to the surface of the panel by applying an electrical field (lateral electrical field) parallel to the surface of the panel. In the liquid crystal display devices of this IPS system, common electrodes are also formed on the first substrate where video signal lines (drain lines), scan signal lines (gate lines), thin film transistors and pixel electrodes are formed, and the liquid crystal layer is driven by an electrical field in a direction in the plane of the first substrate that is created as the difference in the voltage applied to the pixel electrode and the common electrode. In the liquid crystal display devices of the IPS system having this structure, linear pixel electrodes are aligned in a layer above the common electrodes in sheet form formed of a transparent conductive film, for example, with an insulating film in between, so as to overlap the common electrodes.

A type of this IPS system where wall structures are formed so as to cross adjacent pixels in the liquid crystal display device in order to increase the aperture ratio in the liquid crystal display unit, pixel electrodes are formed on the sidewalls of these wall structures, and common electrodes and counter electrodes are formed on the TFT substrate and the facing substrate, respectively, so that electrical fields parallel to the substrate surface are generated in order to drive the liquid crystal layer has been widely used in recent years.

In addition, the gap between the TFT substrate and the facing substrate in the liquid crystal display devices is several microns, which is very small, and therefore, it is extremely important to set the gap between the TFT substrate and the facing substrate to an appropriate value in order to control the transmission of light through the liquid crystal. Therefore, it has been proposed to allow the wall structures to also function as spacers for maintaining the gap between the TFT substrate and the facing substrate.

When a liquid crystal display device is manufactured, it is necessary to fill the space between the substrates with liquid crystal and seal it. The methods for filling the space with liquid crystal that have been widely used in recent years include a method that is referred to as the liquid crystal drop filling method (ODF system), according to which a required amount of liquid crystal is first dropped on one substrate, and after that is sealed with the other substrate, and thus, the space between the substrates is filled in with liquid crystal.

Though the ODF system has such advantages that large scale manufacturing facilities as compared to those using a conventional liquid crystal filling method are unnecessary, the time for manufacture can be shortened and mass production is easy, very high precision is required in the dropping of the liquid crystal and for the maintenance of the gap between the substrates.

When this ODF system is applied to the liquid crystal display device where the wall structures function as a spacer as described above, there is a concern about the generation of low temperature impact bubbles. The low temperature impact bubbles are bubbles generated in an environment where the temperature is as low as approximately −20° C., particularly from among so-called vacuum bubbles that are generated when an impact due to an external force is applied to the liquid crystal panel where liquid crystal is sealed and a negative pressure is created in the liquid crystal layer, and thus, a gas component, such as of nitrogen, that has been dissolved in the liquid crystal layer comes out.

It is difficult for these low temperature impact bubbles to be dissolved again, and thus, it is not easy for them to disappear, thereby often causing inconsistency in the display. Low temperature impact bubbles are easily generated in the portions where a substrate and a spacer make contact with each other, and it has been experimentally confirmed that the measures for preventing low temperature impact bubbles from being generated perform inversely proportional to the area of contact between the spacers and the substrates.

The reason why low temperature impact bubbles are generated, which is a problem, in the liquid crystal display devices of the IPS system using wall structures is that the height of the wall structures is constant, and the wall structures are formed along all of the long sides of the pixels, and therefore, the liquid crystal display devices are in such a state where only so-called main spacers are aligned with high density, which provides no space where sub-spacers that are slightly shorter than the main spacers are arranged. That is to say, the area of contact between the substrates and the spacers is large as compared to a case where the sub-spacers are arranged.

In the case when a liquid crystal display device where the wall structures also function as spacers is manufactured using the ODF system as described above, the wall structures directly receive the pressure when the substrates are pasted together, and thus, there is a concern that the ITO, which is electrodes, the interlayer insulating films and the wall structures may be damaged.

JP 2005-157224A discloses a technology according to which wall structures and supports are arranged between substrates so that the thickness of the liquid crystal layer is controlled in a liquid crystal display device of the VA system. JP 2009-145865A and JP 2010-210866A also disclose a technology for maintaining the thickness of the space between the substrates using spacers. However, all of these are insufficient in preventing low temperature impact bubbles from being generated in the IPS system or in preventing the wall structures from being damaged.

SUMMARY OF THE INVENTION

An object of the present invention is to solve the above-described problems and to provide a liquid crystal display device of the IPS system having wall structures where low temperature impact bubbles can be prevented from being generated and the electrodes and the like within the substrates can be prevented from being damaged.

In order to achieve the above-described object, the liquid crystal display device according to the present invention has the following technical features.

(1) A liquid crystal display device having; a first substrate; a second substrate provided so as to face the first substrate; a liquid crystal layer provided between the first substrate and the second substrate; a wall structure formed on the first substrate; a first electrode provided on at least a side of the wall structure; and a second electrode made up of a pair of electrodes formed on the first substrate and the second substrate so as to face each other, wherein a number of pixels are provided so as to include the first substrate, the second substrate and the liquid crystal layer, a light blocking region is provided around each of the number of pixels, the wall structure is arranged in the light blocking region, a support formed of a transparent and elastic material is arranged on an upper surface of the wall structure, the second substrate is supported by the support, and the liquid crystal layer is driven by an electrical field generated by the first electrode and the second electrode.

(2) The liquid crystal display device according to the above (1), wherein the support has a height of 0.2 μm or more and 0.6 μm or less.

(3) The liquid crystal display device according to the above (1) or (2), wherein the ratio of the area of contact of the support with the second substrate is 0.05% or more and 0.4% or less.

(4) The liquid crystal display device according to any of the above (1) to (3), wherein the support is formed in accordance with an inkjet method or through film transfer.

According to the present invention, low temperature impact bubbles can be prevented from being generated even in a liquid crystal display device of the IPS system having a wall structure. In addition, the supports work as a cushion in order to prevent a force from directly being applied to the wall structures, and therefore, the electrodes and the like inside the substrates can be prevented from being damaged.

DESCRIPTION OF THE EMBODIMENTS

In the following, the present invention is described in detail using a preferred embodiment.

Figure 1:
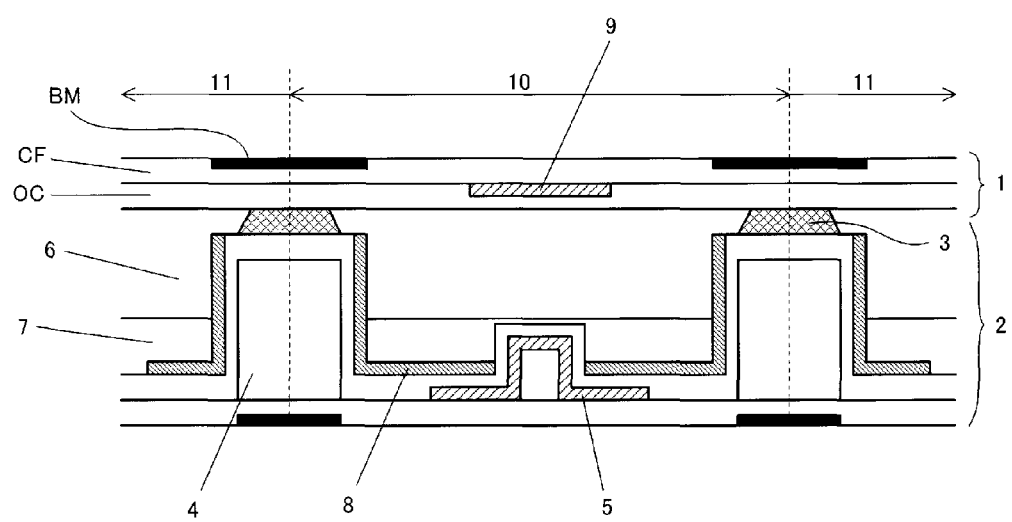
FIG. 1 is a cross-sectional diagram schematically illustrating the structure of a pixel in the liquid crystal display device according to one embodiment of the present invention.
Figure 2:
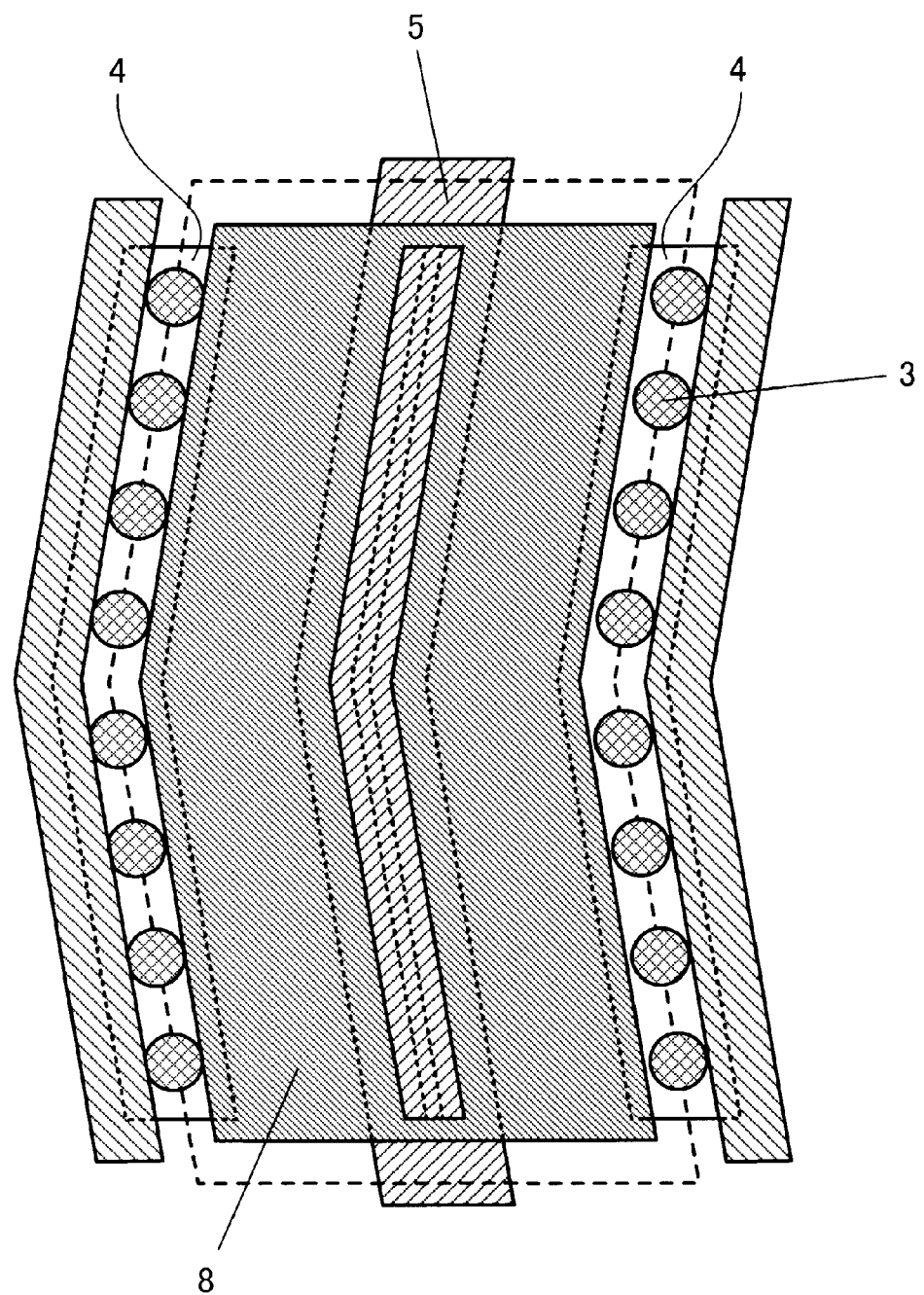
FIG. 2 is a plan diagram schematically illustrating the structure of a pixel in the liquid crystal display device according to one embodiment of the present invention.

FIG. 1 is a cross-sectional diagram schematically illustrating the structure of a pixel in the liquid crystal display device according to the present invention, and FIG. 2 is a plan diagram schematically illustrating the structure of a pixel in the liquid crystal display device according to the present invention.

As shown in FIG. 1, the liquid crystal display device according to the present invention has: a TFT substrate 2, which is a first substrate; a color filter (CF) substrate 1, which is a second substrate, provided so as to face the TFT substrate 2; a liquid crystal layer 6 provided between the TFT substrate 2 and the CF substrate 1; wall structures 4 formed on the TFT substrate 2; pixel electrodes 8, which are first electrodes, provided on at least sides of the wall structures 4; and common electrodes 5 and counter electrodes 9 formed on the TFT substrate 2 and on the CF substrate 1 so as to face each other, and a number of pixels are provided so as to include the TFT substrate 2, the CF substrate 1 and the liquid crystal layer 6, a light blocking region is provided around each of the number of pixels, the wall structures 4 are provided in the light blocking regions, supports 3 formed of a transparent and elastic material are arranged on the upper surface of the wall structures 4, the CF substrate 1 is supported by the supports 3, and the liquid crystal layer 6 is driven by electrical fields generated by the pixel electrodes 8, the common electrodes 5 and the counter electrodes 9.

The liquid crystal display device according to the present embodiment has such a structure that a gap is provided between the CF substrate 1 and the TFT substrate 2 that face each other, and the gap is filled in with liquid crystal so that the liquid crystal layer 6 is formed. Here, the CF substrate 1 is supported by the supports 3 formed on the wall structures 4.

The CF substrate 1 has filters for red, green and blue, and thus gives color to light that has emitted from the backlight (not shown) and transmitted through the liquid crystal layer 6. In addition, as described below, a black matrix BM is formed on the CF substrate so as to cover the borders between pixels, and the CF substrate 1 further includes the counter electrodes 9 and an overcoat layer OC. This overcoat layer OC is provided so as to prevent the counter electrodes 9 from unnecessarily short circuiting another circuit element.

Though not shown, gate signal lines for applying a scan signal and drain signal lines for applying a video signal are arranged on the TFT substrate 2 in a matrix, and each pair of gate signal lines and each pair of drain signal lines define a rectangular pixel 10 that includes the TFT substrate 2, the CF substrate 1 and the liquid crystal layer 6. Though other circuit elements, such as TFTs or switching elements, are also arranged on the TFT substrate 2, they are omitted in the drawings. As for the material of the CF substrate 1 and the TFT substrate 2, glass substrates are generally used, but transparent resin substrates having insulating properties may be used.

The counter electrodes 9 and the common electrodes 5 are formed on the CF substrate 1 and on the TFT substrate 2 so as to face each other and form pairs. The counter electrodes 9 and the common electrodes 5 are formed in accordance with a method where an electrode film is formed of a transparent conductive material, such as ITO (indium tin oxide), in accordance with a sputtering method and is selectively etched in accordance with a photolithographic method. In addition to ITO, other materials, such as IZO (indium zinc oxide), can be used.

Furthermore, the wall structures 4 are formed on the TFT substrate 2 of a photosensitive resin material, for example, in accordance with an already known photolithographic method. In the present invention, as shown in FIG. 1, the pixel electrodes 8 are formed on the sides of the wall structures 4, and the pixel electrodes 8 are thus arranged so as to extend in the direction from the TFT substrate 2 towards the CF substrate 1 in the liquid crystal layer 6 so that a uniform electrical field can be applied through the liquid crystal layer 6 in the horizontal direction (lateral direction in FIG. 1), and thus, unevenness in the display can be prevented from occurring.

The wall structures 4 are formed in the light blocking regions bordering the pixels 10 and the adjacent pixels 11, and therefore do not affect the display performance in the display region. Accordingly, although the wall structures 4 may be formed in the effective display region of the display device, there is no limitation to this, and the wall structures 4 may be formed in a peripheral circuit region for the display unit that is not in the effective display region.

Here, the light blocking regions are regions for blocking light which are formed on the CF substrate 1 and do not contribute to the display. Though in the present embodiment a black matrix layer BM is formed of a photosensitive resin or the like so as to provide light blocking regions, the TFTs, the gate signal wires, the source signal wires and the like in addition to the black matrix layer BM can have light blocking performance so as to be used as the light blocking regions.

After the formation of the wall structures 4, pixel electrodes 8 are formed so as to cover at least the sides of the wall structures 4. Like the common electrodes 5, the pixel electrodes 8 are formed of a transparent conductive material, such as ITO or IZO, in accordance with a sputtering method and a photolithographic method.

As described above, the pixel electrodes 8 are formed at least on the sides of the wall structures 4 in order to apply a uniform lateral electrical field through the liquid crystal layer 6, and it is preferable for them not to be formed on the upper portion of the wall structures 4. This is because there would be a risk of them affecting the form or the stability of the below-described supports 3. Accordingly, it is preferable for a film for removing the electrodes to be applied in advance to the upper portion of the wall structures 4 so that a transparent conductive material, such as ITO, cannot be provided.

In addition, an insulating film 7 is formed of a material, such as SiN, in accordance with a publicly known CVD method or the like so as to cover the wall structures 4 and the common electrodes 5. The insulating film 7 is provided in order to prevent the common electrodes 5 and the pixel electrodes 8 from unnecessarily short circuiting another circuit element, such as a gate signal line, as described above.

In this structure, an electrical field having a component parallel to the CF substrate 1 and the TFT substrate 2 can be generated between a wall electrode 8 and a common electrode 5 or a counter electrode 9 so that this electrical field can drive the liquid crystal molecules in the liquid crystal layer 6. Such a liquid crystal display device is known as one that can provide a display with a so-called wide field of view angle and is referred to as the IPS system or the lateral electrical field system because of the specificity in the application of the electrical field to the liquid crystal. In addition, the liquid crystal display devices having such a structure carry out normally black display where the light transmittance is minimum (black display) when no electrical field is applied through the liquid crystal, and the light transmittance increases as the application of an electrical field increases.

In the case where a liquid crystal display device having such a structure is manufactured in accordance with an ODF system, however, the pressure applied to the TFT substrate 2 and the CF substrate 1 when the substrates are pasted together after the space between the substrates has been filled in with the liquid crystal layer 6 is directly conveyed to the wall structures 4 and the pixel electrodes 8, and therefore, there is a risk of the internal structure, including the wall structures 4, the pixel electrodes 8 and the insulating film 7, being damaged.

In order to prevent the internal structure of the liquid crystal display device from being damaged, supports 3 are formed on the upper portion of the wall structures 4 as spacers according to the present invention so that these supports 3 support the CF substrate 1 and absorb the impact applied to the substrates with the internal structure.

A process for forming supports 3 on the wall structures 4 is described below. It is necessary for the supports 3 to be optically transparent in order for the light waves propagating through the liquid crystal layer 6 not to be blocked and to have elasticity in order to absorb the stress applied to the CF substrate 1. As an example of a material that satisfies these requirements, a resin, such as urethane, can be cited, but there is no limitation to this as long as the material satisfies these requirements.

The supports 3 can be formed in necessary locations in accordance with an inkjet method, for example, and are formed on the upper portion of the wall structures 4 in the present embodiment. It is also possible to print supports 3 on a film and place the supports 3 onto the wall structures 4 through film transfer. Furthermore, the supports 3 can be formed at the same time as the formation of the insulating film 7 in order to simplify the manufacturing process.

As shown in FIGS. 1 and 2, the supports 3 are in truncated cone form in the present embodiment, but the form is not limited to this, and a cylinder, an elliptic cylinder, a prism, a truncated pyramid and other forms that make contact with a wall structure 4 and the CF substrate 1 through a certain area so that the thickness of the liquid crystal layer 6 can be maintained at a constant can be used.

FIG. 2 is a plan diagram schematically illustrating the structure of one pixel in the liquid crystal display device according to the present embodiment. As shown in FIG. 2, the pixels in the present embodiment are made in a region surrounded by gate lines and drain lines, which are not shown. In addition, each pixel is bent at the center so that the pixel is divided into an upper region and a lower region where the liquid crystal molecules are initially aligned in such a manner that the liquid crystal molecules rotate in opposite directions in the upper region and the lower region when a voltage is applied to the pixel.

When the liquid crystal molecules are initially aligned as described above, the liquid crystal layer maintains the alignment state (homogeneous alignment) where the long axis of the liquid crystal molecule group in the liquid crystal layer is parallel to the surface of the substrate while only the azimuth thereof rotates. The white display tinges blue in the direction of the azimuth, which includes the direction of the alignment, and the white display tinges yellow in the direction perpendicular to this. Accordingly, in the present embodiment, regions of which the directions of rotation are opposite to each other are formed within each pixel so that the tinges of color can be set off so that the white display is not tinged with any color in the direction at a certain angle of view.

In the present embodiment, the wall structures 4 are formed continuously on the two sides, left and right, of the pixels so as to sandwich the pixels, and the supports 3 are arranged regularly at constant intervals on the wall structures. When the supports 3 are thus arranged regularly, such a problem as the local concentration of stress in a portion of the CF substrate 1 can be prevented. However, the arrangement of the supports 3 is not limited to the regular arrangement as in FIG. 2 as long as the CF substrate 1 can be appropriately supported.

However, it is preferable for the contact ratio per unit area of the supports 3 on the CF substrate 1 and the height of the supports 3 to be within a certain range. Here, the contact ratio per unit area of the supports 3 on the CF substrate 1 is a ratio of the area of the upper portions of the supports 3 that make contact with the CF substrate 1 to the area of the CF substrate 1, and it is preferable for this value to be 0.05% or more and 0.4% or less. When the contact ratio per unit area exceeds 0.4%, there arises such a problem as the generation of low temperature impact bubbles in the portions through which the supports 3 and the CF substrate 1 make contact. When the contact ratio per unit area is lower than 0.05%, the supports 3 cannot sufficiently support the CF substrate 1, it becomes difficult to maintain the gap between the CF substrate 1 and the TFT substrate 2 at a constant, and there is a risk that the resistance against stress applied to the CF substrate 1 (pressure resistance) may lower.

In addition, it is preferable for the height of the supports 3 to be 0.2 μm to 0.6 μm. When the height is too great, the resistance against the stress applied to the CF substrate 1 excluding the component in the vertical direction lowers, which results in the reduction of the pressure resistance. When the height is too small, the gap maintained between the wall structures 4 and the CF substrate 1 is not sufficient, and the contact area vis-à-vis the CF substrate 1, the supports 3 and the wall structures 4 is great as compared to the volume of the liquid crystal in the gap, which enhances the possibility of low temperature impact bubbles being easily generated.

After the formation of the supports 3, the CF substrate 1 and the TFT substrate 2 on which the supports 3 are arranged on the wall structures 4 are pasted together in the ODF process as described above so that a liquid crystal panel is gained.

The basic structure of the liquid crystal display device according to the present embodiment is described above, and by adopting this structure, a uniform electrical field can be applied in the lateral direction through the liquid crystal layer, and furthermore, the spacer function and the cushioning function of the supports 3 allow the gap between the substrates to be maintained at a constant, and thus, the risk of the wall structures 4 and the pixel electrodes 8 being damaged can be avoided without fail. Furthermore, the range of the adjustment of the gap between the facing substrates is widened by the supports 3 so that low temperature impact bubbles can be prevented from being generated due to the misalignment relating to the gap.

EXAMPLES

Prototypes were made with the contact area ratio and the height of the supports 3 being varied according to the manufacturing method as described above (prototypes 1 to 10). Table 1 shows the contact area ratios and the heights of the supports in the respective prototypes. In addition, the results of the test for low temperature impact bubbles and the test for repeated pressure carried out on the respective liquid crystal panels are shown together.

As for the test for low temperature impact bubbles, a 1 cm steel ball was dropped onto each liquid crystal panel that had been kept at −20° C. for 24 hours from a distance of 10 cm in an environment where the temperature was −20° C., and whether or not (NG or OK) bubbles were generated in the liquid crystal panel was visually confirmed. As for the test for repeated pressure, a load of 150 [N] (calculated as φ=10 mm) was applied to each liquid crystal panel 50 times repeatedly at a speed of 200 [N/sec], and whether or not (NG or OK) there was a pressure mark was visually confirmed one minute after the load was removed.

As can be seen from the results in Table 1, in the case where the height of the supports was 0.0 μm or the contact area ratio of the supports was 0.5% or more, the results of the test for low temperature impact bubbles were NG. In the case where the height of the supports was 0.7 μm or the contact area ratio of the supports was less than 0.05%, the results of the test for repeated pressure were NG. Accordingly, it can be understood that it is possible to form a highly reliable liquid crystal panel in the case where the height of the supports is 0.2 μm to 0.6 μm and the contact area ratio is 0.05% to 0.4%.

TABLE 1

| Prototype | 1 | 2 | 3 | 4 | 5 | 6 | 7 | 8 | 9 | 10 |
|---|---|---|---|---|---|---|---|---|---|---|
| Height of supports (μm) | 0.7 μm | 0.7 μm | 0.6 μm | 0.6 μm | 0.6 μm | 0.5 μm | 0.4 μm | 0.2 μm | 0.2 μm | 0.0 μm |
| Contact area ratio of supports | 0.048% | 0.032% | 0.606% | 0.410% | 0.006% | 0.057% | 0.074% | 0.211% | 0.056% | 0.000% |
| Test for low temperature impact bubbles | OK | OK | NG | OK | OK | OK | OK | OK | OK | NG |
| Test for repeated pressure | NG | NG | OK | OK | NG | OK | OK | OK | OK | OK |

Though the present invention is described above, the present invention is not limited to the embodiments or examples, and appropriate modifications in design are naturally possible as long as the gist of the present invention is not deviated from.

It is possible for the present invention to provide a liquid crystal display device of an IPS system having a wall structure where low temperature impact bubbles can be prevented from being generated, and electrodes and other components inside the substrates can be prevented from being damaged.

What is claimed is:
1. A liquid crystal display device, comprising:
a first substrate;
a second substrate provided so as to face said first substrate;
a liquid crystal layer provided between said first substrate and said second substrate;
a wall structure formed on said first substrate;
a first electrode provided on at least a side of said wall structure, the first electrode comprising a first surface; and
a second electrode comprising a pair of electrodes formed on said first substrate and said second substrate so as to face each other, one electrode of the pair of electrodes comprises a second surface, and another electrode of the pair of electrodes comprises a third surface facing the second surface,
wherein
the first surface faces the second surface or the third surface,
the second surface has at least a portion that is higher than the first surface in a cross-sectional view,
the second surface has at least another portion that overlaps the first surface in plan view,
a number of pixels are provided so as to include said first substrate, said second substrate and said liquid crystal layer,
a light blocking region is provided around each of said number of pixels,
said wall structure is arranged in said light blocking region,
a support formed of a transparent and elastic material is arranged on an upper surface of said wall structure,
said second substrate is supported by said support, and said liquid crystal layer is driven by an electrical field generated by said first electrode and said second electrode.

2. The liquid crystal display device according to claim 1, wherein said support has a height of 0.2 μm or more and 0.6 μm or less.

3. The liquid crystal display device according to claim 1, wherein the contact ratio per unit area of said support on said second substrate is 0.05% or more and 0.4% or less.

4. The liquid crystal display device according to claim 1, wherein said support is formed in accordance with an inkjet method or through film transfer.

5. The liquid crystal display device according to claim 1, wherein said upper surface of said wall structure is free from said first electrode.

* * * * *